US009922053B1

(12) United States Patent
Caughey

(10) Patent No.: US 9,922,053 B1
(45) Date of Patent: Mar. 20, 2018

(54) SYSTEM FOR IMAGE CAPTURE, NOTATION AND DISTRIBUTION

(71) Applicant: PhotoSurvey, LLC, Solana Beach, CA (US)

(72) Inventor: Patrick J. Caughey, Solana Beach, CA (US)

(73) Assignee: PhotoSurvey, LLC, Solana Beach, CA (US)

( * ) Notice: Subject to any disclaimer, the term of this patent is extended or adjusted under 35 U.S.C. 154(b) by 128 days.

(21) Appl. No.: 15/225,732

(22) Filed: Aug. 1, 2016

Related U.S. Application Data

(60) Provisional application No. 62/200,443, filed on Aug. 3, 2015.

(51) Int. Cl.
*G06F 17/30* (2006.01)
*H04N 1/32* (2006.01)

(52) U.S. Cl.
CPC .... *G06F 17/3028* (2013.01); *G06F 17/30265* (2013.01); *H04N 1/32149* (2013.01)

(58) Field of Classification Search
CPC .............. H04N 9/3179; H04N 1/32149; G06F 17/3028; G06F 17/30265; G06F 17/30011
USPC ....................................................... 725/105
See application file for complete search history.

(56) References Cited

U.S. PATENT DOCUMENTS

| | | |
|---|---|---|
| 2002/0087546 A1 | 7/2002 | Slater et al. |
| 2003/0110120 A1 | 6/2003 | Salehi |
| 2006/0102020 A1 | 5/2006 | Takuda et al. |
| 2006/0170968 A1 | 8/2006 | Maki et al. |
| 2008/0040374 A1* | 2/2008 | Prabhakar .......... G06F 17/30864 |
| 2009/0327232 A1 | 12/2009 | Carter et al. |
| 2013/0262316 A1* | 10/2013 | Hruska ................. G06Q 20/227 705/67 |
| 2014/0229426 A1* | 8/2014 | Gootee, III ......... G06F 17/5004 707/608 |
| 2016/0041621 A1* | 2/2016 | Naya ..................... H04N 9/3179 345/173 |
| 2016/0140146 A1 | 5/2016 | Wexler et al. |
| 2016/0162514 A1 | 6/2016 | Cheung et al. |
| 2016/0212577 A1* | 7/2016 | Dor ......................... H04W 4/02 |
| 2017/0187910 A1* | 6/2017 | Masi .................. H04N 1/32149 |

* cited by examiner

*Primary Examiner* — Hung Lam
(74) *Attorney, Agent, or Firm* — Clause Eight IPS; Michael Catania

(57) ABSTRACT

Disclosed is a server-based system allowing users to utilize photo-based documentation to capture, organize, annotate, and share collections of photographs and images. Photos and images are added to a Photo Set. Photo Sets belong to Teams. Teams have users with memberships. Each Photo Set also has membership groups consisting of users. Each membership group may have common and unique permissions that differ from other groups. Photos and images may be flagged and annotated to bring attention to specific portions of the photo or image. Photo Sets are stored and managed from a central server. When a user updates a Photo Set, the updates are sent to other members of the Photo Set. Users may use a mobile application on a smartphone or tablet to capture an image and add flags before the image is uploaded to the server. Typical camera images may also be captured, annotated, and uploaded from a personal computer. Standard flags or a combination of standard and custom flags may be used.

16 Claims, 9 Drawing Sheets

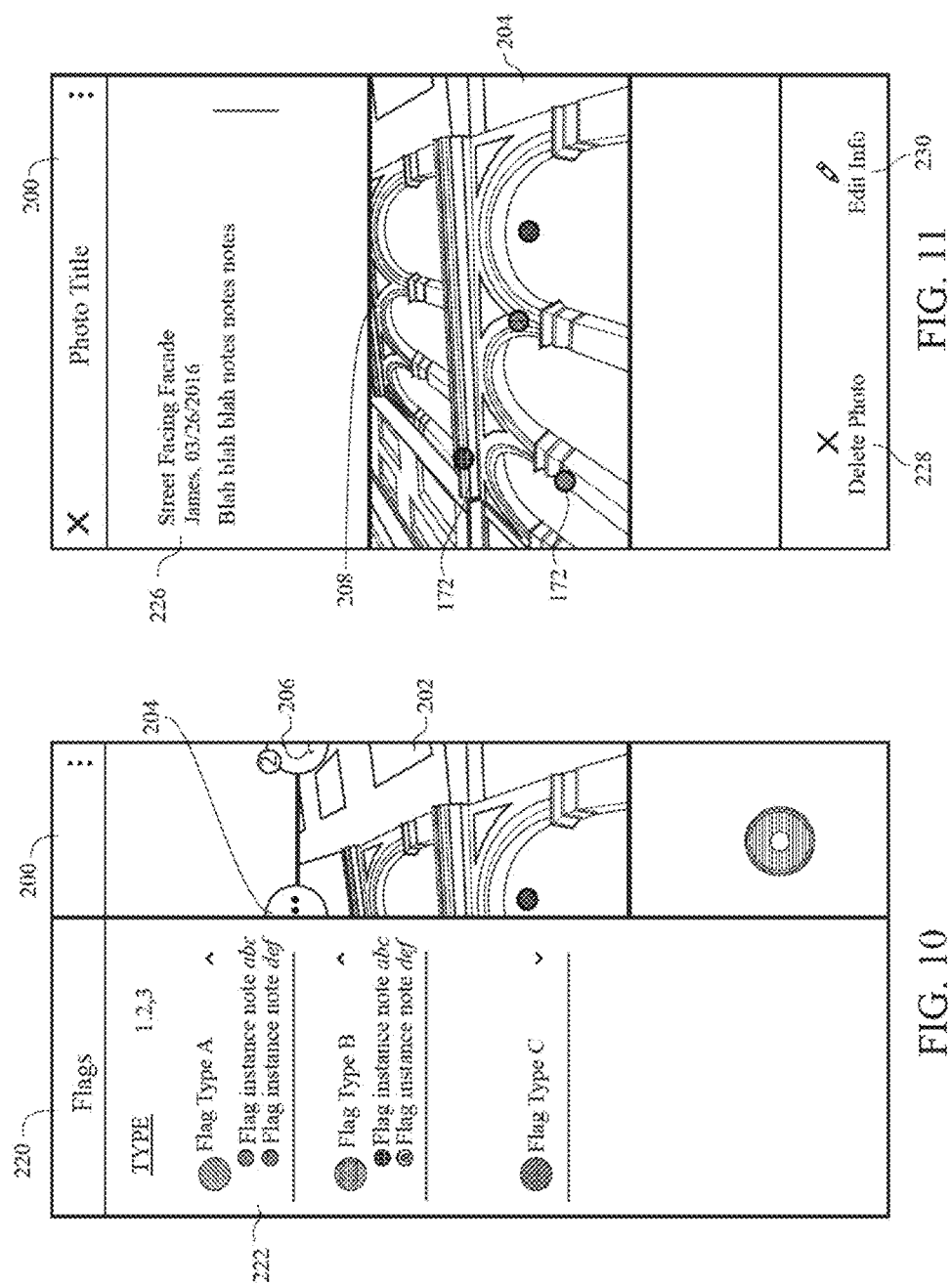

SYSTEM FOR IMAGE CAPTURE, NOTATION AND DISTRIBUTION

CROSS REFERENCES TO RELATED APPLICATIONS

The Present Application claims priority to U.S. Provisional Patent Application No. 62/200,443, filed on Aug. 3, 2015, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention pertains generally to an image capture, notation, and distribution system for use in Photo-based Documentation. More particularly, the present invention pertains to a server-based application configured to communicate with mobile applications allowing users to capture, annotate, and share particular images. The Present invention is particularly, but not exclusively, useful as a tool to capture, annotate, and distribute images allowing for a group of users to share images and information regarding the subject of the images.

Description of the Related Art

"A picture is worth a thousand words." "Every picture tells a story." "One look is worth a thousand words." "The drawing shows me at one glance what might be spread over ten pages in a book." These phrases convey the meaning that a picture tells a story just as well as a large amount of descriptive text.

Using standard methods, when an image is needed for a Photo Set portfolio, the image is captured and stored for later processing. When at a computer workstation capable of working with images, a user uploads the image to the system, and then manually adds notes and markers to the image. After updating the image, the user saves the updated image and adds it to a virtual folder or directory. This method of adding markers and comments to an image is time consuming and prone to mistakes. Furthermore, notes and markers added to the image become part of the image and cannot be modified. Mistakes are even more likely when a third party adds markers and notes using only information from the person who captured the image. If a person wants to review the history of a specific updated image, that person may need to sift through all the notes and history of each image, which is a time consuming effort and may not reveal all aspects of the image's history, potentially leading to costly mistakes and errors. Further, if a user updates an image, the updated image may not make it to a third party that depends on the images to estimate, schedule, and perform work on the subject of the image. In addition, in the traditional system of annotating images, a user may spend extensive hours looking through a portfolio of annotated images looking for specific markers, which may be part of a custom vocabulary of markers, or preparing a list of all people who provided input for the collection of photos.

What is needed in the industry is a service and application that allows individuals to use camera, smartphone and tablet technology to easily and quickly add markers to an image, add comments and voice recordings to a marker, distribute a new or updated image to other users, as well as a function to allow any user to list, filter, and sort existing markers in an image General definitions for terms utilized in the pertinent art are set forth below.

APP is a software application for network accessible devices, such as mobile phones and tablet computers.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

BLUETOOTH LOW ENERGY (aka "BLE" or "BLUETOOTH LE") is a communication format from the Bluetooth Special Interest Group which uses the 2.4 gigaHertz band of BLUETOOTH technology but with a simpler modulation system that supports data pockets ranging from 8 to 27 octets, which are transferred at 1 Mbps.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, OPERA, and CHROME.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Web sites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

Wireless AP (access point) is a node on the wireless local area network (WLAN) that allows wireless devices to connect to a wired network using Wi-Fi, or related standards.

Referring initially to FIG. 1, a prior art image is shown and generally referred to as 10. The image 10 is a picture of a residence having typical house features. The text box 12 is superimposed on the image 10 having an arrow identifying damage to a stair rail. The text box 12 reads, "Extensive termite damage to existing stair rail." Using traditional methods, the text box 12 would be added later using a computer workstation or other equipment known in the art, sometimes days after the image 10 is captured leaving the traditional method ripe for mistake. This problem may be compounded when a person other than the person who captured the image 10 applies the text box 12 using notes or word of mouth. A second text box 14 is shown identifying a feature of the image 10, where the text box 14 reads, "9' span from post to post." The text box 16 identifies a "Failed retaining wall." The text box 18 is an empty box identifying another feature of image 10. The text box 18 shows the box being resized prior to entering actual text. A limitation of the traditional method of annotating an image is that the content of a text box may only hold a few lines of text before it covers too much of the image. This lack of information may lead to ambiguity and uncertainty in how different parties interpret the image and text boxes.

BRIEF SUMMARY OF THE INVENTION

The Present Invention provides a solution to the ambiguity and uncertainty in how different parties interpret the image and annotations.

One aspect of the present invention is a system for a cross-platform server-based application that lets architecture, engineering, and construction professionals, and individuals and teams in all other fields that utilize photo-based documentation, to capture, organize, annotate, and share collections of photographs and images. The collection of photos are called "Photo Sets". Individual users, or members, establish an account on the server side of the system. Photo Sets preferably have multiple members, allowing groups of professionals to collaborate on Photo Sets in near real-time. Image annotations are called "Flags", which are complex data-objects with various properties and associations. The Flags are stored in a database and are associated with a Flag Type and a photo. The Flags are used to identify a particular area or object of interest in an image. Any given Flag is a "Flag type", which is a base template for a flag object placed onto an image. The Flag types are used as templates for the Flags placed on an image. The referenced Flag type determines the Flag's color and display layer on the image, among other attributes.

A "Flag set" is a pre-configured set of Flag types for use with an image. A user must specify a Flag set when creating a Photo Set. The referenced Flag set also dictates the Flag types that are available when working with Photo Set images. For example, an image of the interior of a residential home may have a Flag set containing Flags for drywall repair, carpet replacement, window repair, and appliance replacement. An image of the exterior of a residential home may have a flag set containing Flags for roof repair, siding replacement, painting, and gutter repair. The use of Flag sets allows for quicker and easier interaction between a user and a captured image. If a Flag set does not contain a needed Flag type, the user can create and define a custom Flag type. In addition, a user may create a custom Flag set containing pre-defined and custom Flag types.

Any user with the proper permissions may create a Photo Set. After creating the Photo Set, the user may start to populate the Photo Set with images that may or may not have annotations (Flags). Photo data is stored in a database and are associated with a parent Photo Set. Annotations may take the form of simple text or recorded audio messages. Other system users may be added to the Photo Set as Photo Set Members, which allows a user access to Photo Set content. Each user's membership in the Photo Set may be detailed to allow them read access, read/write access, and administrative access. The system is further designed to notify individual members when another member adds a new image to the Photo Set, comments on an existing image, or a new member is added to the Photo Set.

When a member captures a new image, the member may immediately upload the image to the server-based application or apply one or more Flags to the image then upload the image to the server for distribution to other members of the Photo Set. Members may also generate reports about an individual image, group of images, or an entire Photo Set showing, for example, the number and types of Flags placed on the images.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 10 is a screen shot from a preferred embodiment of the present invention showing a Flag management screen covering a portion of the screen disclosed in FIG. 8.

FIG. 11 is a screen shot form a preferred embodiment of the present invention showing a title screen covering a portion of the screen disclosed in FIG. 8.

DETAILED DESCRIPTION OF THE INVENTION

The following terms as used herein are defined as follows:

Team: A context, group or realm in which one or more user accounts can perform create, read, update and delete actions on content. The actions a user account is allowed to perform depend on access control lists and permission settings associated with the team in context.

Photo Set: A collection of photos, synonymous with album, gallery or folder.

Flag Type: A data object used to categorize flags. Flag types have a title and a description and can be applied to one or many flags.

Flag: A data object mapped to a specific location within a view. A view is a frame through which digital media, such as a photo, video or live camera view, is displayed.

To-do: A data object associated with a flag. To-do objects are synonymous with tasks. They can be assigned to a member of the team in context.

Figure 1:
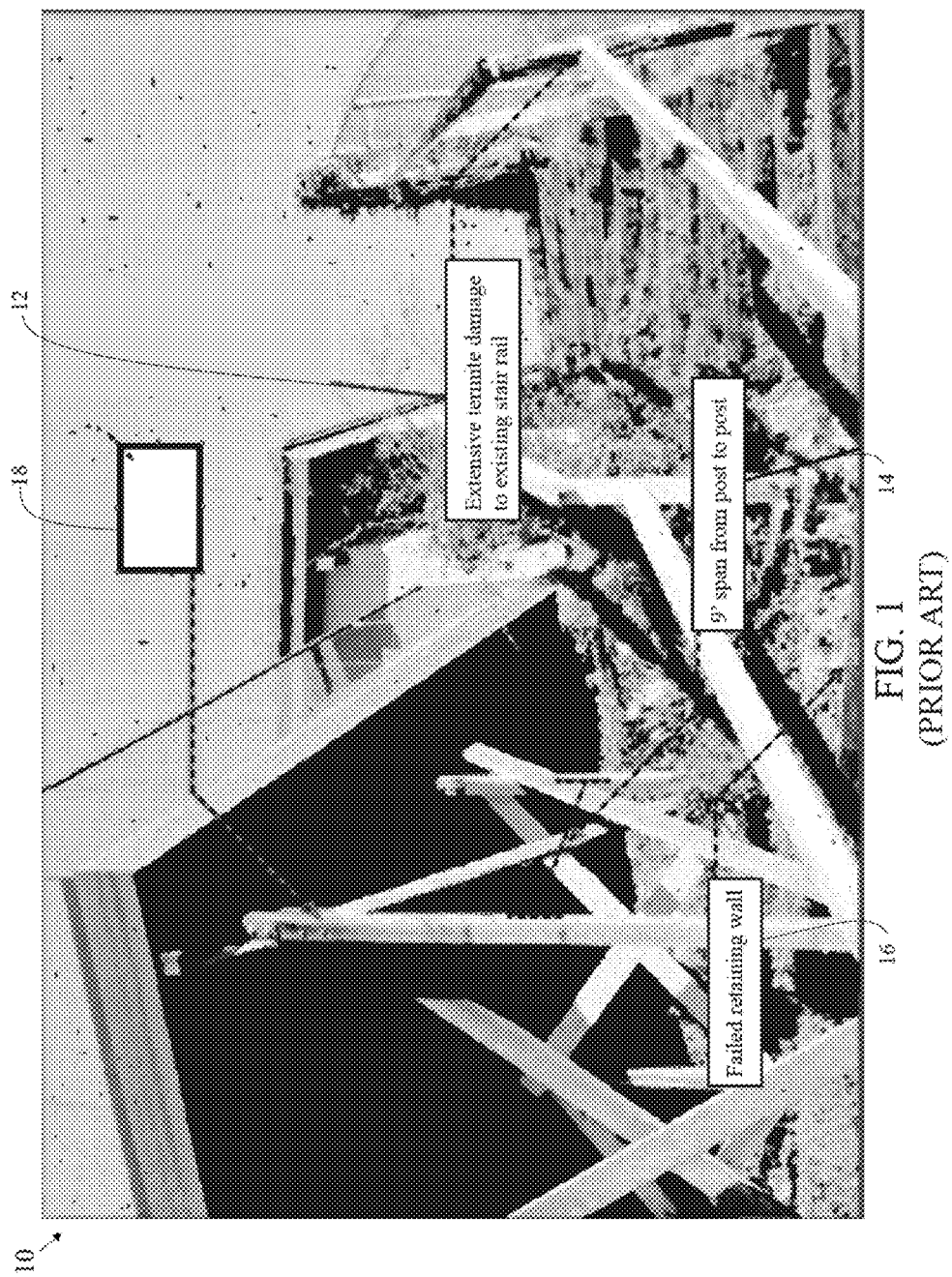
FIG. 1 is a prior art image representing the traditional application of annotations to an image to identify points and areas of interest.
Figure 2:
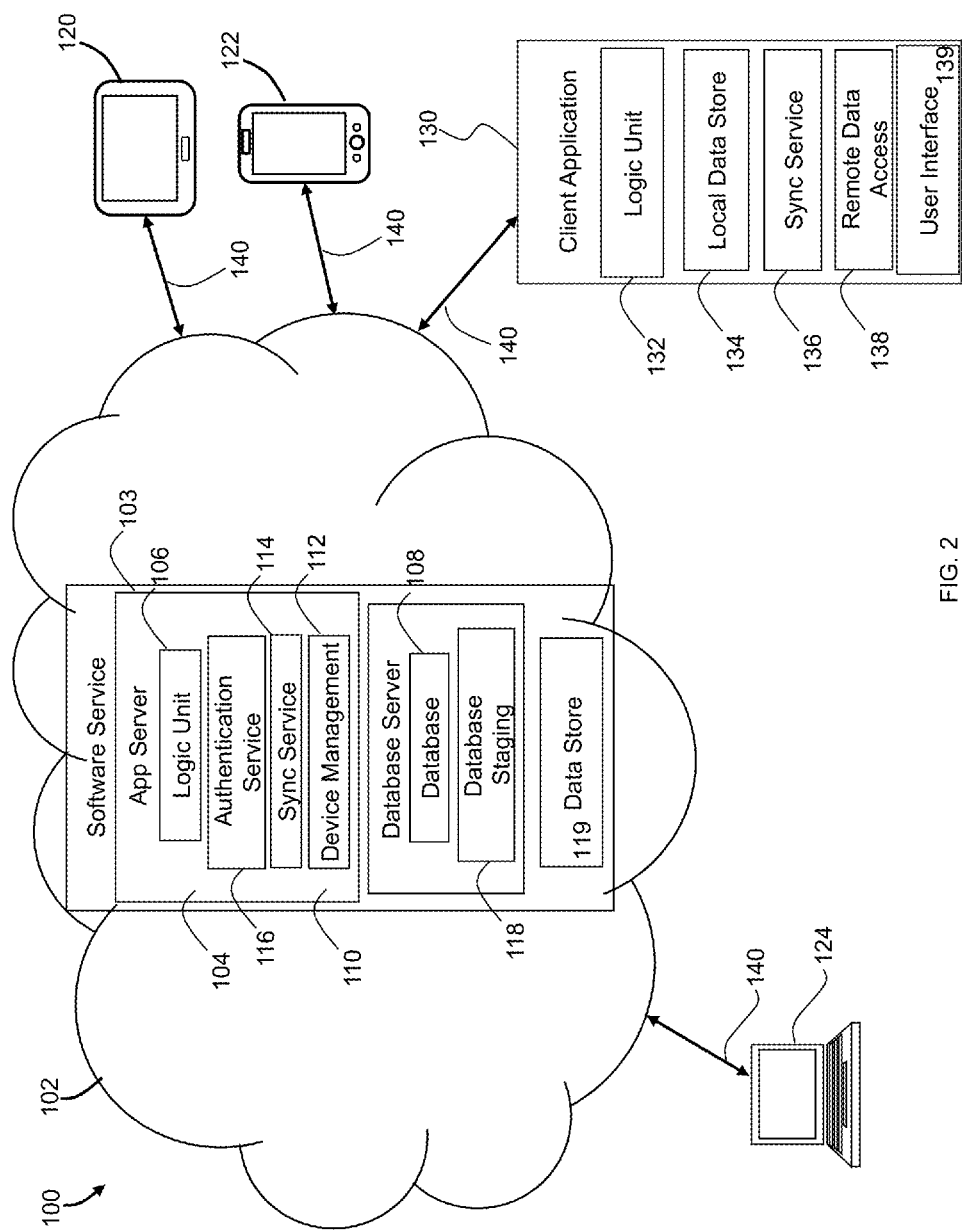
FIG. 2 is a block diagram of a preferred embodiment of the present invention.

Now referring to FIG. 2, a block diagram of a preferred embodiment of system for image capture, image notation and image distribution is shown and generally referred to as 100. The system 100 for image capture, image notation and image distribution preferably comprises a software service 103 located in a cloud-based environment 102 and client devices connected to the cloud 102, such as a personal computer 124, a tablet computer 120, and a smartphone 122. A representation of a client application 130 which would operate on the client devices is shown connected to the cloud 102 through a data link 140. The data link 140 may be any method and protocol for a computing device to connect to the cloud 102 known in the art, including, but not limited to, cellular, Wi-Fi, satellite, and land-based interfaces.

The software service 103 preferably comprises an application server 104, a database server 110, and a data store 119. In a preferred embodiment, the database server 110 relays information to and from the software service 103. It is to be appreciated by someone skilled in the art that the software service 103 may consist of one server and may be scaled to include multiple servers of varying types as system needs and demand increases.

The application server 104 preferably comprises a software logic unit 106 an authentication service 116, a sync service 114 and a device management engine 112. The logic unit 106 provides the operating core of the system for image capture, image notation and image distribution service. The logic unit 106 preferably tracks all Teams, Photo Sets, users, group membership, images, and other support functions associated with the present invention, including notification services. The logic unit 106 preferably uses the database 108 to store all information created, used, and received by the logic unit 106, including, but not limited to, images, flags, flag attributes, comments, and user and account information. In alternative embodiments, multiple databases may be used to store different portions of system and application data. In other alternative embodiments, a separate data store may be used to store image files. In other alternative embodiments, the database 108 may be located in a server separate from the application server 104.

The database server 110 preferably comprises the database 108 and a database staging area 118. The logic unit 106 preferably manages the interaction between the database server 110 and the end devices such as a tablet 120, a smartphone 122, and personal computer 124. In a preferred embodiment, the logic unit 106 stores and retrieves device information from the database 108. In alternative embodiments, the device management unit 112 may store device information locally in the database staging area 118. The sync service 114 manages the flow of information between the software service 103 and authenticated end devices such as a tablet 120 and a smartphone 122.

The tablet 120 and the smartphone 122 may use the client application 130. In a preferred embodiment, the client application 130 preferably comprises a logic unit 132, a local data store 134, a sync service 136, a remote data access 138, and a user interface 139. The logic unit 132 provides the user interface, alerts, and authentication services required to use the software service 103. The local data store 134 controls transmitting and receiving data between the software service 103 and the client application 130. It is to be appreciated by someone skilled in the art that other modules having different functions may be included in the mobile application 130, modules may be combined, and modules may be excluded without departing from the present invention. The device sync service 136 manages the flow of data between the client application 130 and the software service 103 through the data link 140. The client application 130 may be configured to sync on a real-time basis, on a periodic schedule, on demand as determined by the user, or in response to signal from the software service 103. The remote data access 138 controls access to data located in the software service 103 by the client application 130.

In a preferred embodiment a personal computer 124 is configured to allow administrative access to the software service 103 over the data link 140 allowing an operator to manage users, accounts, membership groups, the database 108, the logic unit 106, the Photo Sets, and all information and configurations associated with the Photo Sets. The software service 103 may also be accessed locally to interface with the software service 103 to perform the functions of the personal computer 124.

Figure 3:
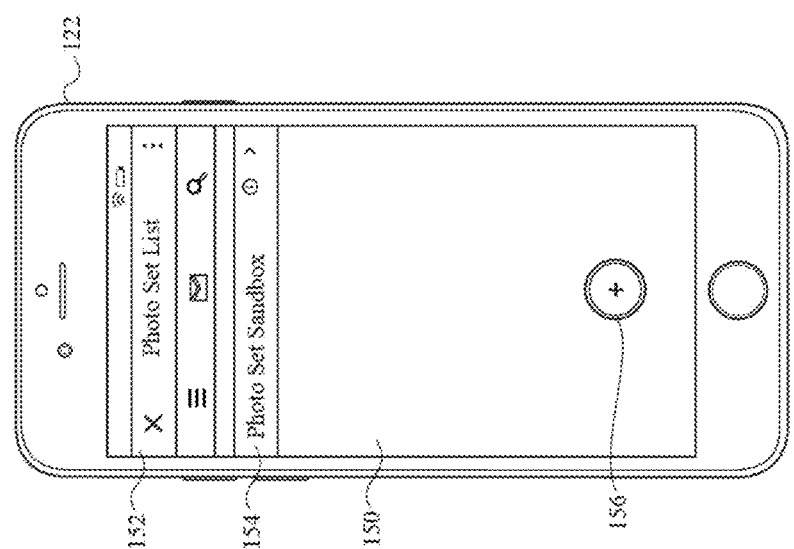
FIG. 3 is a front view of the screen of a smart phone showing a screen configured to list existing Photo Sets.

Moving now to FIG. 3, a front view of a smartphone 122 having a screen 150 listing existing Photo Sets is shown. Located at the top of screen 150 is a screen title 152. Located in the main section of the screen 150 is a list of existing Photo Sets 154. To access the contents of an existing Photo Set, a user may press the existing Photo Set 154, which will take the user to another screen having information about the existing Photo Set 154. If a user desires to add a new Photo Set, the user presses the new Photo Set button 156, which will present the user with prompts to name the Photo Set and add additional Photo Set attributes. The attributes may include users, membership groups, and other Photo Set details such as addresses, contact information, and contractor information. If a user does not add information when the new Photo Set is created, the user may return to the Photo Set at a later time and add any necessary or desired information.

Figure 4:
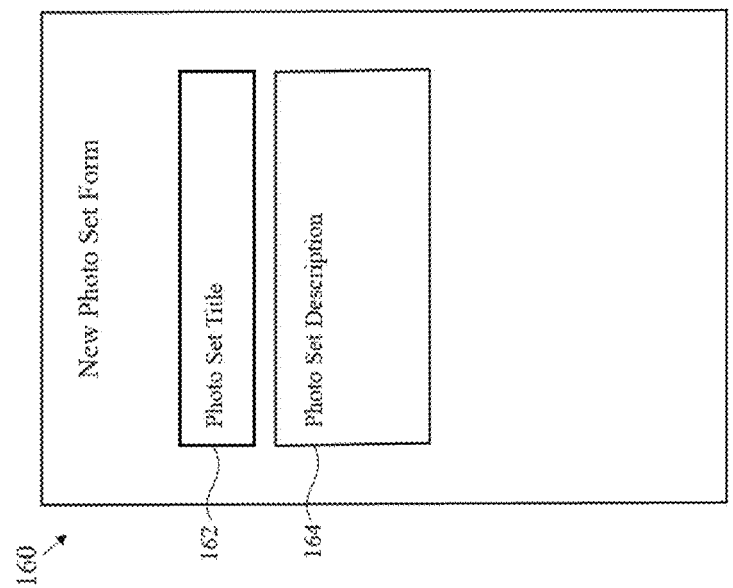
FIG. 4 is a diagram view of a form for creating a new Photo Set.

Referring to FIG. 4, a new Photo Set form is shown and generally referred to as 160. The new Photo Set form 160 provides a user the ability to add a title 162, a description of the Photo Set 164, and a selection menu of possible flag sets 166 to be used in the Photo Set. For example, a user may select "Building Inspections" flag set 168 if the new Photo Set is for the inspection of a building. It is to be appreciated by someone skilled in the art that the selection of possible flag sets 166 will change as standard and custom flag sets are added to the software service 103. If, at the time the Photo Set is created, there is not a flag set to support the needs of the new Photo Set, then the user may create a custom flag set in the software service 103. In certain embodiments, the new custom flag set is made available to other users when creating a new Photo Set.

Figure 5:
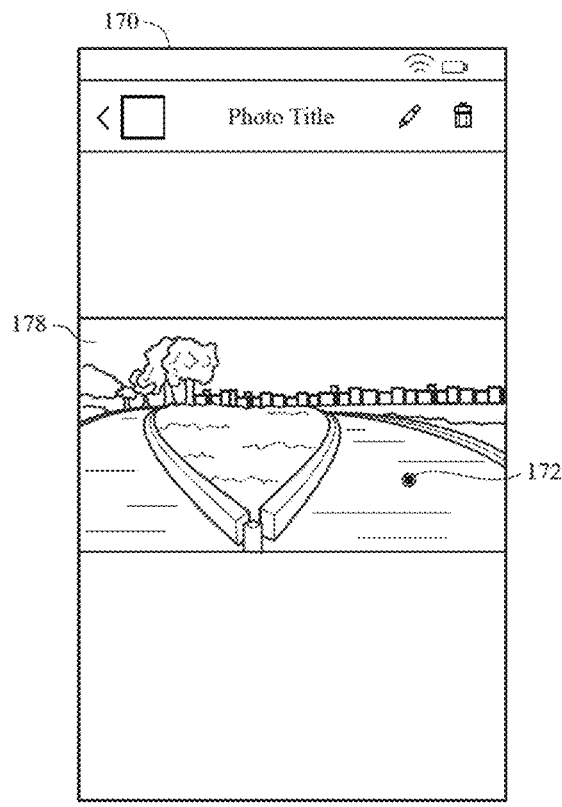
FIG. 5 is a screen shot from a preferred embodiment of the present invention of a captured image with a Flag applied to the image.

FIG. 5 is a screen shot if an image capture screen and generally referred to as 170. The screen 170 displays a captured image 178. A flag 172 has been placed on the captured image 178 designating an item of interest in the image 178. It is to be appreciated by someone skilled it the art that multiple flags 172 may be placed on the captured image 178, each designating a different item or area of interest.

Figure 6:
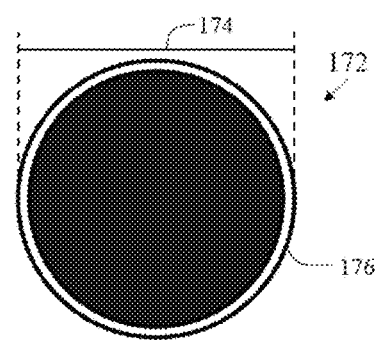
FIG. 6 is a diagram view of an enlarged Flag marker showing an outer ring used in identifying the Flag.

Referring now to FIG. 6, an enlarged view of flag 172 is shown. Generally, the flag 172 is drawn as circular, solid-filled geometries in one of three visual display styles. These display styles allow the flag 172 to stand out depending on the object being identified in the captured image 178 (see FIG. 5), proximity to other flags, or overall composition. The flag size 174 is proportional to the size of the screen used to view the captured image 178 and the associated flags 172. The flag size 174 adjusts as a user zooms in and out. Put another way, the proportions of the flag 172 is always relative to the device's screen width. The flag 172 may also contain a ring 176, which visually separates the flag 172 from surrounding objects. The ring 176 is also helpful in identifying a specific flag 172 when multiple flags are located in close proximity to each other. In a preferred embodiment, the center point of the flag 172 is measured as an offset from the top and left edges of the captured image 178 as a percent value of the image dimensions to allow the flag 172 to appear in the same position regardless of the platform used to view the captured image 178, i.e. web page, iOS, or Android.

In certain embodiments, the flag 172 may be displayed using different display styles. For example, a user may desire a line between two points identifying an item of interest that spans a distance, such as a support beam. To create a line, a user double taps or clicks a flag 172 to create a starting point and an end point for the line by dragging the end point away from the starting point. This action alters the display mode of the flag 172. A leader line may be formed when the position of the ending point falls outside the radius 174 of the flag 172. If the position of the ending point falls inside the radius 174, a pointer is formed consisting of a starting point having a larger radius 174 and an ending point having a smaller radius 174 located on the edge of the starting point. As a user zooms in or out on an image 178, the separation between the starting and ending points of a flag line change with the level of zoom resulting in the flag 172 changing from a pointer to a leader line or vice versa.

Figure 7:
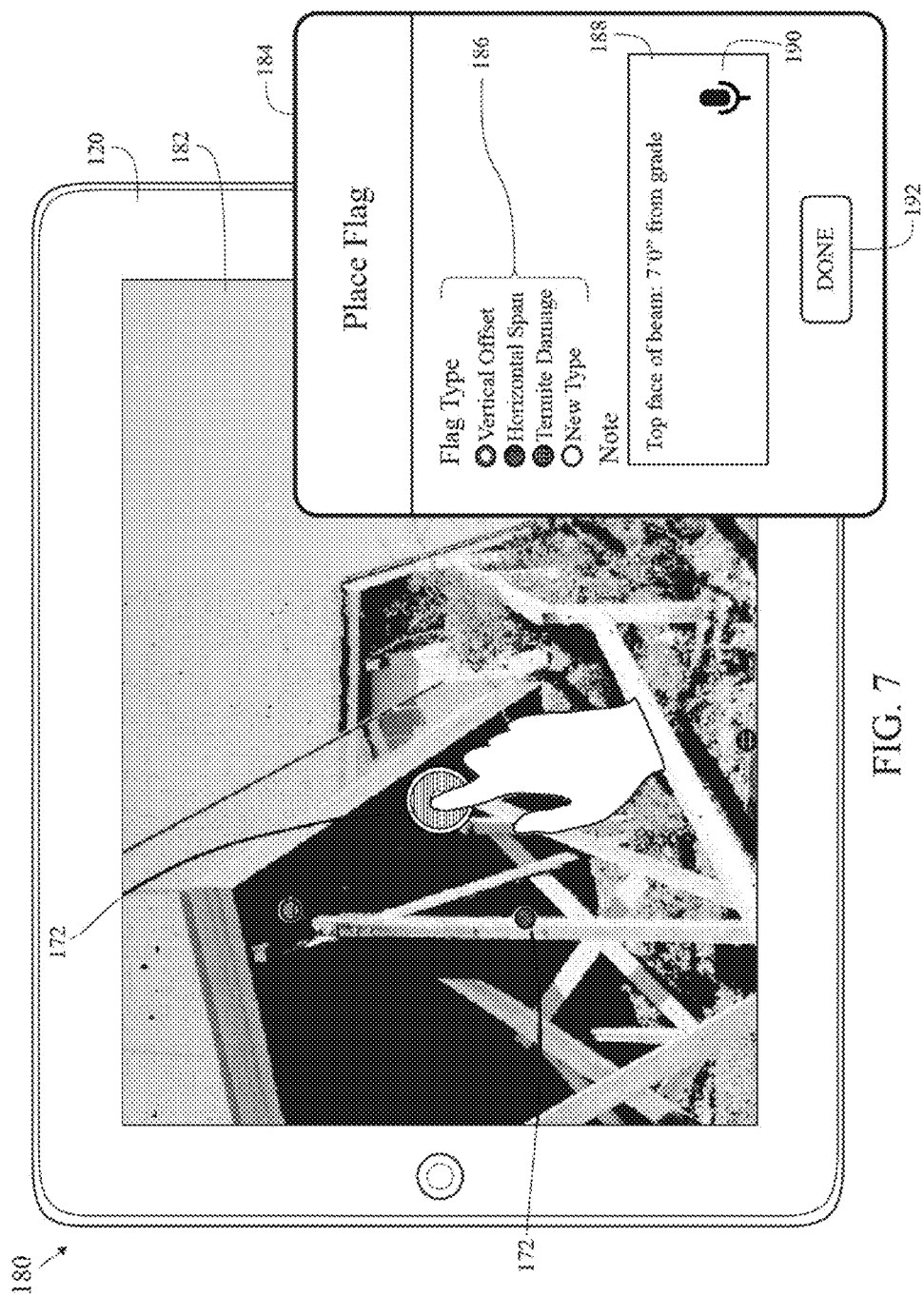
FIG. 7 is a combination view of a captured image having flags applied to multiple points of interest and a Flag attribute window.

Referring now to FIG. 7, a flag placement screen on a tablet 120 is shown and generally referred to as 180. Also shown is a flag attribute window 184. As shown in FIG. 7, multiple flags 172 have been placed on the image 182. When a flag 172 is placed, a flag attribute window 184 appears to allow a user to add information about the flag 172, such as a flag type 186, a flag note 188, and an audio capture button 190. Audio capture button 190 allows a user to dictate the note where the dictated audio is then converted into text and displayed in the flag note 188. A user may change the contents of the flag note 188 before the user presses a "Done" button 192, which closes the flag attribute window 184.

Figure 8:
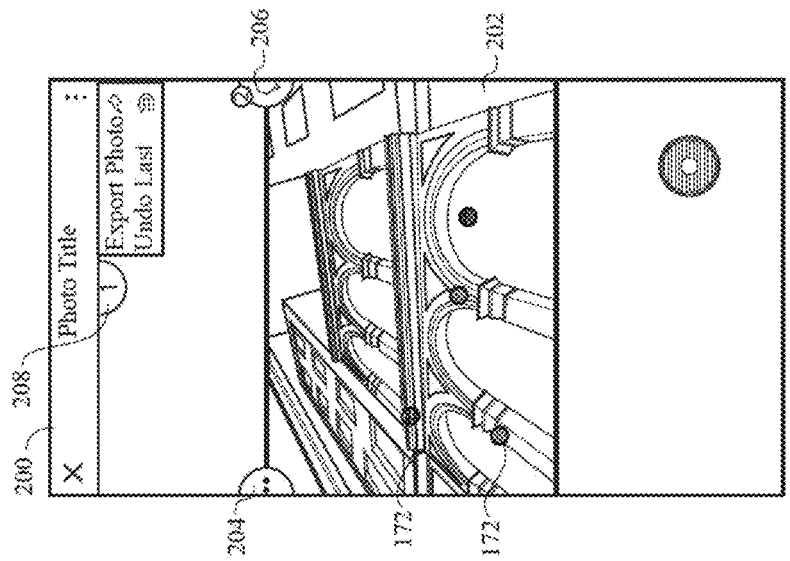
FIG. 8 is a screen shot from a preferred embodiment of the present invention showing a captured image with multiple Flags and buttons to access comments, title, and Flags.

FIG. 8 is a typical flag capture screen of the present invention and generally referred to as 200. The flag capture screen 200 preferably comprises a captured image 202, a flag management button 204, a comment management button 206, and a title button 208. As shown in FIG. 8, a user has placed multiple flags 172 on a captured image 202.

Figure 9:
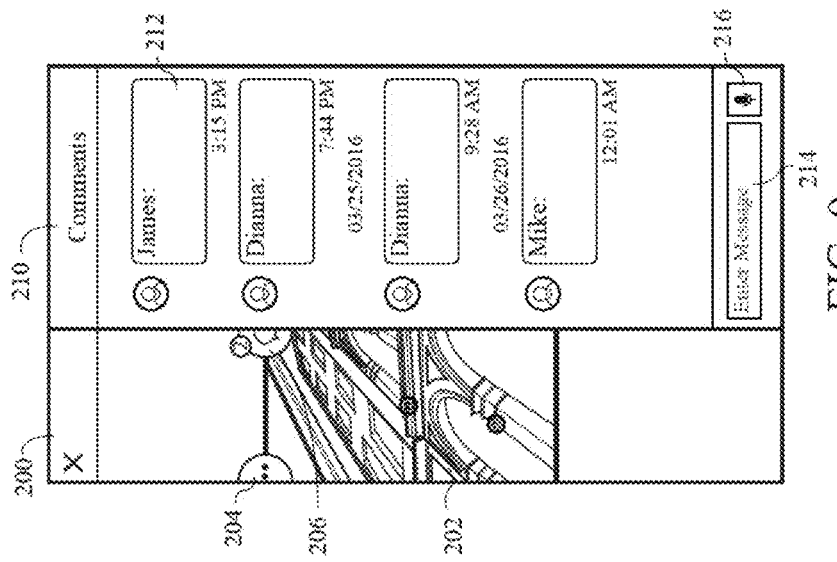
FIG. 9 is a screen shot from a preferred embodiment of the present invention showing a comment screen covering a portion of the screen disclosed in FIG. 8.

Referring now to FIG. 9, an image capture screen 200 is shown with a comment screen 210 superimposed over the screen 200. The comment screen 210 preferably comprises individual comments 212, a text entry box 214 for adding a new comment, and an audio button 216, which allows a user to dictate a comment where the dictated audio is converted into text and displayed in the text entry box 214 allowing a user an opportunity to review the comment before posting it as an individual comment 212. In a preferred embodiment, the individual comments 212 are listed in chronological order. Alternatively, the individual comments 212 may be listed by the user who created the comment. Further, a user may search the individual comments 212 for specific keywords and phrases. The comment screen 210 appears when a user taps a comment management button 206. To make the comment screen 210 disappear, a user may again touch the comment management button 206 or touch on any exposed portion of the image 202.

Referring to FIG. 10, image capture screen 200 is shown with flag management screen 220 superimposed over screen 200. Flag management screen 220 lists individual flag information. Further, flag management screen 220 may list flags existing on image 202 by type, by flag creator, and by date/time added to image 202. Flag management screen 220 appears when a user taps flag management button 204. To make flag management screen 220 disappear, a user may again tap flag management button 204 or touch on any exposed portion of image 202.

Referring now to FIG. 11, an image capture screen 200 is shown with the title and an information screen 226 showing the title of the image and a brief description superimposed over a portion of the image 202. If a user decides to remove the captured image 202 from the Photo Set, the user may press delete the button 228. If the user wants to edit the title or description, the user may press the edit button 230, which will display the title and description as editable text.

Figure 12:
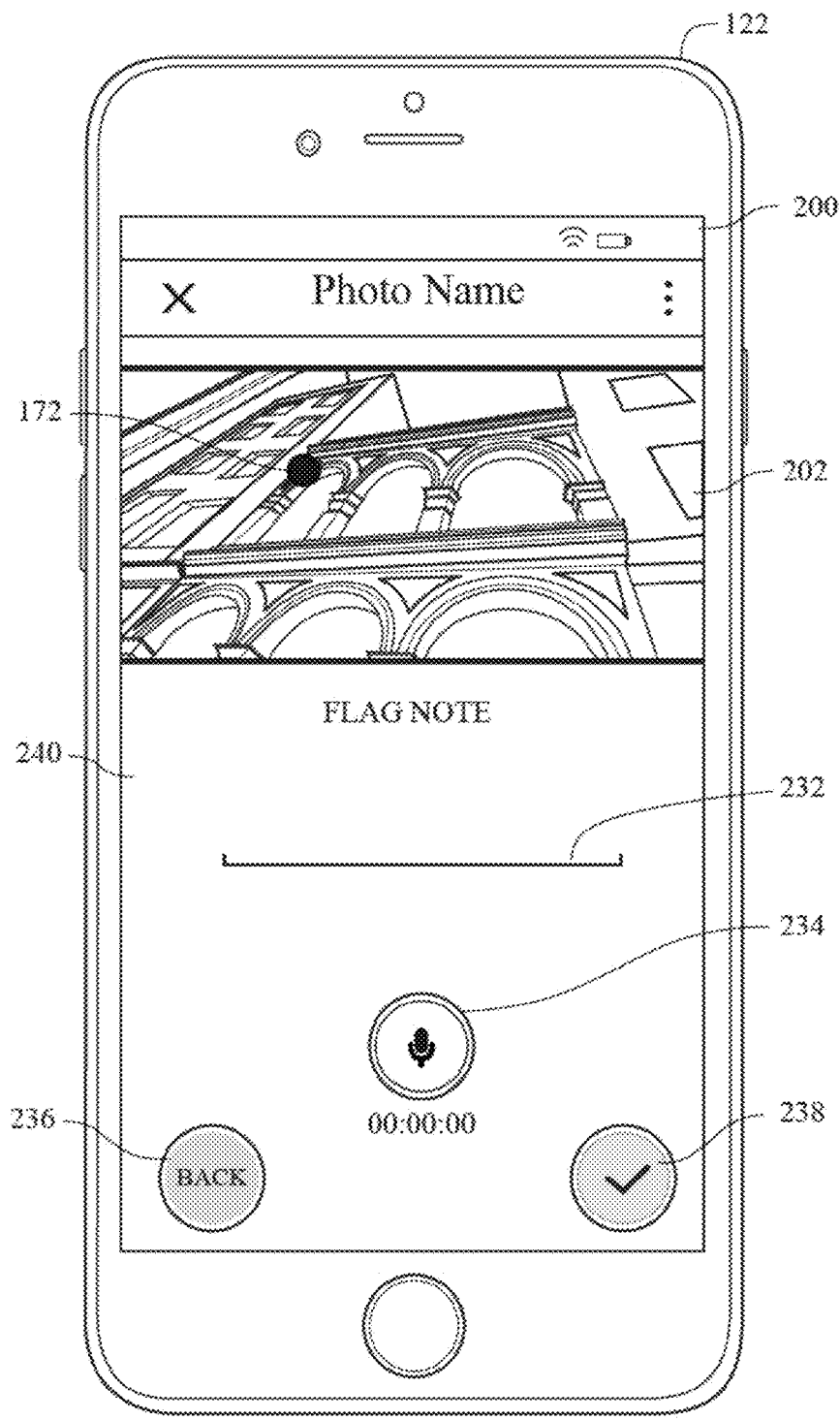
FIG. 12 is a front view of a smart phone showing an input screen for recording speech and displaying the text of the recorded speech for a Flag note associated with a Flag placed on a captured image.

Moving now to FIG. 12, an image capture screen 200 is shown with a flag note screen 240 superimposed over a portion of image 202. The flag note screen 240 consists of a note entry section 232 where a user may type in a flag note. Alternatively, a user may press an audio capture button 234, which allows a user to dictate a note where the dictated note is converted to text and displayed in the note entry section 232. After entering a note, the user may confirm the note and enter it into the system by pressing the button 238. If a user does not want to complete the addition of a new note, the user presses the button 236, which causes flag note screen to disappear. In certain embodiments, a confirmation dialog box may be presented to the user if text has been entered in the note entry section 232 but not accepted into the system.

Figure 13:
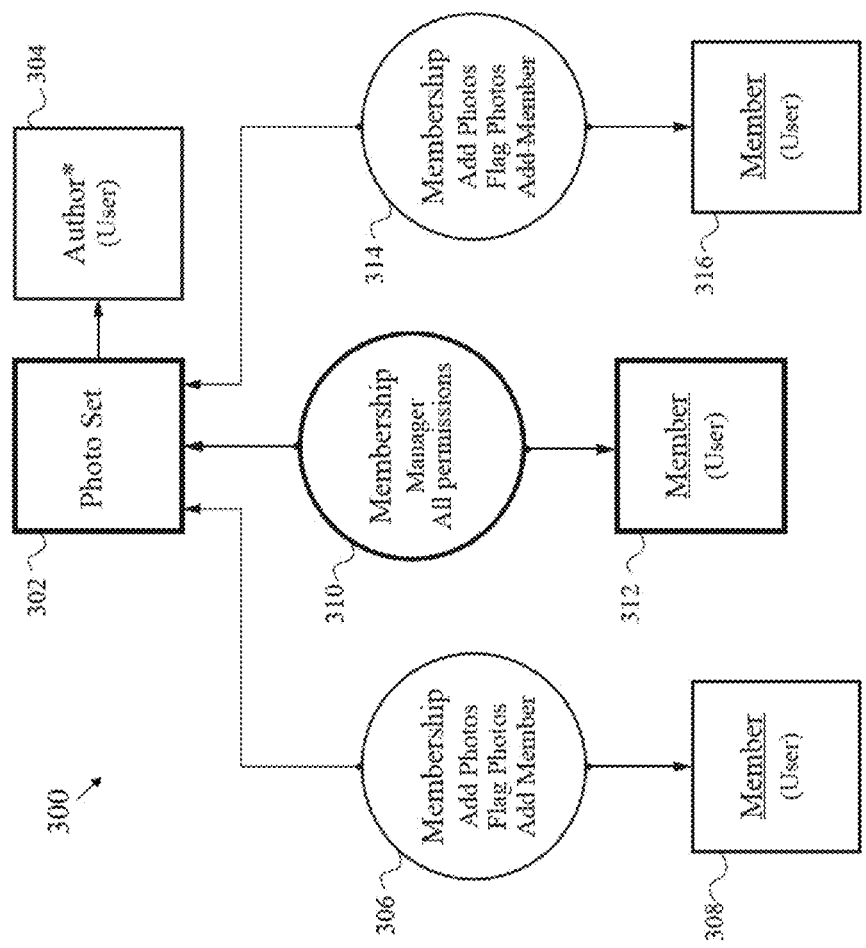
FIG. 13 is a diagram showing the relationship between a Photo Set, a Photo Set author, membership groups, and end users.

Lastly, referring to FIG. 13, a diagram showing the relationships between a Photo Set, Photo Set author, membership groups, and users is shown and generally referred to as 300. The diagram 300 starts with a Photo Set 302. The author 304 of the Photo Set 302 has full administrative access to the Photo Set 302. Each Photo Set 302 may have one or more membership groups where the permissions of each membership group may vary. An author 304 may then add individual users to each membership group. As shown in FIG. 13, a first membership group 306 is created. The permissions associated with first membership group 306 allows any member of group 306 to add photos, add Flags to photos, and add new members to first membership group 306. After forming first membership group 306, individual members, or users 308, are added to the group. A second membership group 310 is then added by the author 304. The second membership group 310 is for managers and has all permissions allocated to it. Members, or users 312, are then added to the second membership group 310. Lastly, the author 314 forms a third membership group 314. The author 304 has allocated the permissions to add photos and add Flags to photos to the third membership group 314, but the author 304 denied the permission to add members, or users 316, to the third membership group 314. As with other membership groups, the author 304 then adds members, or users 316, to the third membership group 314. Any particular Photo Set may have only one membership group or many membership groups depending on the needs and scale of the Photo Set. In addition, each membership group may have only one member, or user, or many members, or users, again depending on the needs and scale of the Photo Set.

The mobile devices utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., GALAXY S® smartphones from Samsung Electronics Co., Ltd, and many more. Examples of tablet computing devices include the IPAD® tablet from Apple Inc., and the GALAXY TAB® tablet from Samsung Electronics Co., Ltd.

A typical mobile communication device includes an accelerometer, I/O (input/output), a microphone, a speaker, a GPS chipset, a Bluetooth component, a Wi-Fi component, a 3G/4G component, RAM memory, a main processor 310, an OS (operating system), applications/software, a Flash memory, SIM card, LCD display, a camera, a power management circuit, a battery or power source, a magnetometer, and a gyroscope.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network 60 for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Components of a server of includes a CPU component, a graphics component, PCI/PCI Express, memory, non-removable storage, removable storage, Network Interface, including one or more connections to a fixed network, and SQL database(s), which includes the venue's CRM. Included in the memory, is an operating system, a SQL server or other database engine, and computer programs/software. The venue server also includes at least one computer program configured to receive data uploads and store the data uploads in the SQL database. Alternatively, the SQL server can be installed in a separate server from the venue server.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A system for image capture, image notation and image distribution, the system comprising:
    a mobile device comprising a camera and a mobile application, the mobile application comprising a logic unit module, a local data store module, a device sync service module, a remote data access module and a user interface module;
    an application server comprising a logic unit, a device management module, a sync service, and an authentication service; and
    a database server comprising database and a database staging module;
    wherein the mobile application is configured to place a flag on a captured image of a photo set, wherein the photo set is a collection of images, wherein the flag is a complex data-object with a plurality of properties and a plurality of associations;
    wherein the flag is stored in the database of the database server and the flag is associated with a flag type and a photo;
    wherein each flag type is stored in the database.

2. The system according to claim 1 wherein photo data is stored in the database and associated with a parent photo set.

3. The system according to claim 1 wherein the device management module is configured to manage an interface between the database server and the mobile device.

4. The system according to claim 1 wherein the sync service is configured to manage the flow of information between the application server and the mobile device.

5. The system according to claim 1 wherein the mobile application is configured to place a plurality of flags on the captured image.

6. A method for image capture, notation and distribution for utilization in surveying, the method comprising:
- capturing an image of an object using a camera of a mobile device comprising a client application, the client application comprising a logic unit module, a local data store module, a device sync service module, a remote data access module and a user interface module;
- placing a flag on the captured image of a photo set using the client application, wherein the photo set is a collection of images, wherein the flag is a complex data-object with a plurality of properties and a plurality of associations;
- storing the flag in a database of a database server of a software service;
- associating the flag with a flag type and a photo at the database server; and
- storing each flag type in the database.

7. The method according to claim 6 wherein photo data is stored in the database and associated with a parent photo set.

8. The method according to claim 6 wherein the device management module is configured to manage an interface between an application server of the software service and the client device.

9. The method according to claim 6 wherein the sync service is configured to manage the flow of information between the application server and the client device.

10. The method according to claim 6 wherein the client application is configured to place a plurality of flags on the captured image.

11. A system for image capture, image notation and image distribution, the system comprising:
- a client device comprising a camera and a client application, the client application comprising a logic unit module, a local data store module, a device sync service module, a remote data access module and a user interface module;
- a software service comprising
  - an application server comprising a logic unit, a device management module, a sync service, and an authentication service,
  - a database server comprising database and a database staging module,
  - a data store
- wherein the client application is configured to place a flag on a captured image of a photo set, wherein the photo set is a collection of images, wherein the flag is a complex data-object with a plurality of properties and a plurality of associations;
- wherein the flag is stored in the database of the database server and the flag is associated with a flag type and a photo;
- wherein each flag type is stored in the database.

12. The system according to claim 11 wherein photo data is stored in the database and associated with a parent photo set.

13. The system according to claim 11 wherein the device management module is configured to manage an interface between the database server and the client device.

14. The system according to claim 11 wherein the sync service is configured to manage the flow of information between the application server and the client device.

15. The system according to claim 11 wherein the client application is configured to place a plurality of flags on the captured image.

16. The system according to claim 11 wherein the client device is one of a smartphone, a table computer or a personal computer.

* * * * *